UNITED STATES PATENT OFFICE.

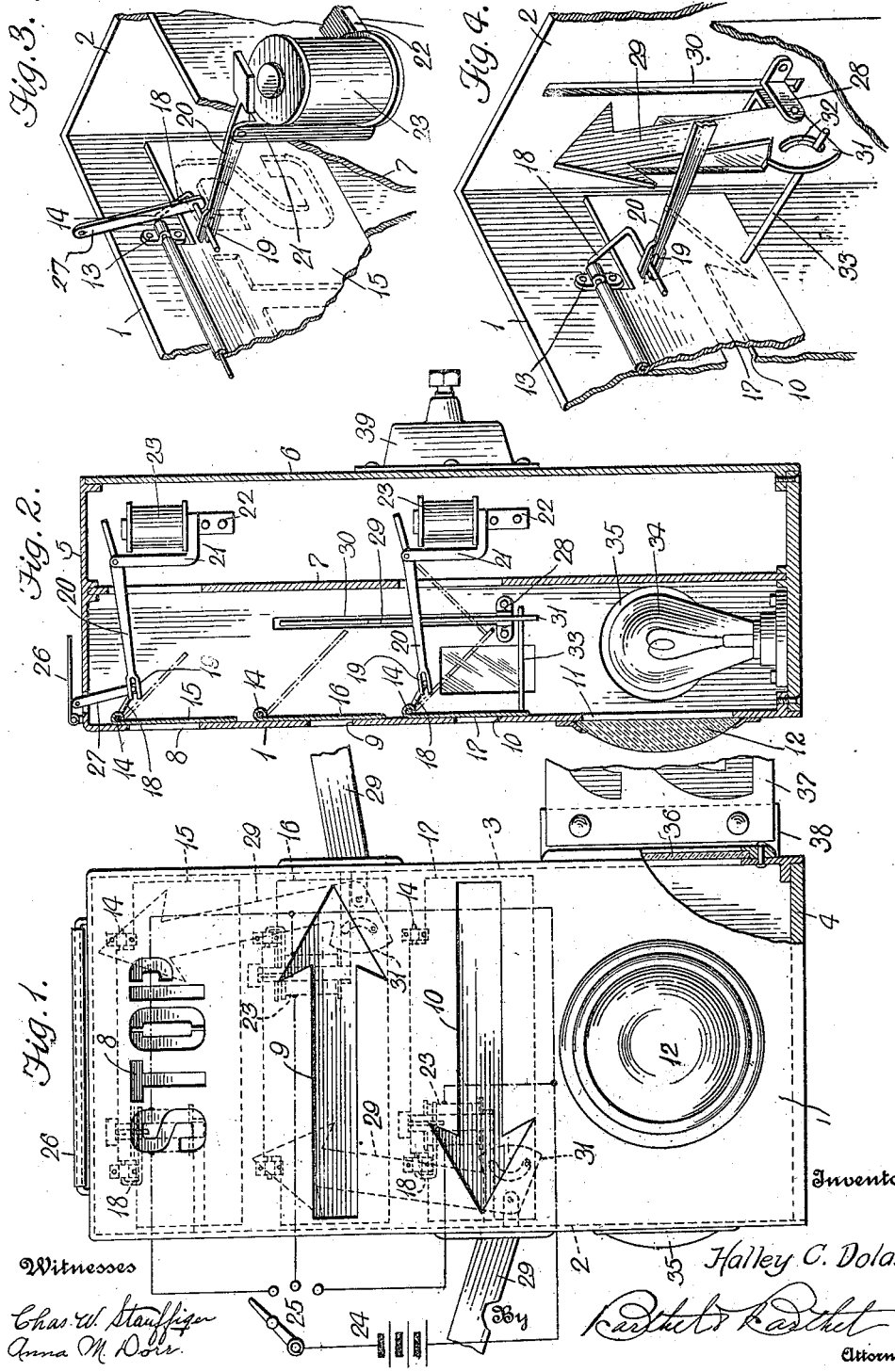

HALLEY C. DOLAN, OF DETROIT, MICHIGAN.

ELECTRIC SIGNAL FOR AUTOMOBILES.

1,145,005. Specification of Letters Patent. Patented July 6, 1915.

Application filed May 2, 1914. Serial No. 835,831.

*To all whom it may concern:*

Be it known that I, HALLEY C. DOLAN, a citizen of the United States of America, residing at Detroit, in the county of Wayne and State of Michigan, have invented certain new and useful Improvements in Electric Signals for Automobiles, of which the following is a specification, reference being had therein to the accompanying drawings.

This invention relates to an electric signal for automobiles, and more particularly to that type designed for use upon the rear end of an automobile or similar vehicle to prevent collisions incurred by an automobile colliding with a preceding machine that has suddenly stopped or turned to one side.

The primary object of my invention is to provide a novel signal of the above type that may be employed in the day or at night to indicate that an automobile is about to stop or is to turn to the right or left, the signal embodying stationary illuminated means for indicating direction at night; movable means for indicating direction during the day, and movable means for indicating at night or day that a vehicle is about to stop. The means enumerated above are all electrically actuated from a suitable source of energy controlled by the chauffeur of the machine, direct or through the medium of a clutch or brake lever.

With the above and other objects in view the invention resides in the novel construction, combination and arrangement of parts to be hereinafter specifically described and then claimed, and reference will now be had to the drawing, wherein there is illustrated a preferred embodiment of my invention, but it is to be understood that the structural elements illustrated are susceptible to such changes, as in the size, shape and manner of assemblage, as fall within the scope of the claims.

In the drawing, Figure 1 is a front elevation of the signal partly broken away and partly in section; Fig. 2 is a vertical sectional view of the same; Fig. 3 is a perspective view of a portion of the signal illustrating an electro-magnet forming part of the same, and Fig. 4 is a perspective view of another portion of the signal, illustrating the actuating means of one of the indicator arms.

The signal comprises a rectangular casing having a front wall 1, side walls 2 and 3, a bottom plate 4, a top plate 5, a rear wall 6, and a vertical transverse partition 7. These elements can be stamped and pressed from sheet metal or made of a suitable material that can be finished to harmonize with the vehicle in connection with which it is used. These elements are furthermore assembled to form a rigid and durable structure capable of withstanding the vibrations to which it is subjected when a vehicle is in action.

The front wall 1, at the upper end thereof, has openings 8 shaped to provide characters forming the word "Stop." Below these openings the front wall 1 has transverse openings 9 and 10, one above the other, shaped to represent arrows pointing to the right and left. The front wall 1, at the lower end thereof has an opening 11 provided with a lens or bulls' eye 12.

The inner side of the front wall 1 above each of the openings 8, 9 and 10 has bearings 13 for pintles 14 of shutters 15, 16 and 17 associated with the openings 8, 9 and 10, respectively, said shutters normally closing the openings and swinging inwardly to permit of rays of light being emitted from the front wall of the casing. Each pintle 14 has a crank 18 engaged by the bifurcated end 19 of a fulcrumed armature lever 20, which is supported by the arm 21 of a bracket 22, carried by a side wall of the casing. Each bracket is provided with an electro-magnet 23 adapted, when energized, to attract the armature of the lever 20, rock the pintle 14 and open a shutter. The electro-magnets 23 are in circuit with a suitable source of electrical energy 24 and a switch 25.

The top plate 5 is provided with a pivoted member 26 upon which is printed or otherwise marked the word "Stop", this member being used during the day time. One end of the member is pivotally connected to a link 27 and the opposite end loosely mounted on the crank 18 of the shutter 15, whereby, when the electro-magnet 23 is energized and the armature lever 20 engaging said crank shifted, both said shutter and said member will be actuated.

The inner sides of the walls 2 and 3 are provided with bearings 28 and pivotally connected to said bearings are the lower ends of arrow-shaped indicating arms 29 adapted to be swung outwardly through slots 30 provided therefor in the walls 2 and 3, to indicate right or left direction of movement. The lower pivoted ends of the arms 29 have off-set portions 31 provided with curved slots 32 and extending into said slots are inwardly projecting cranks or pins 33 rigidly connected to the inner sides of the shutters 16 and 17. It is therefore apparent that when either of the shutters is actuated, one of the indicating arms is swung outwardly at a side of the casing and said arms correspond in the day time to the function of the arrow shaped openings 9 and 10, at night.

The partition 7 of the casing has openings providing clearance for the operating mechanism of the shutters and indicating arms and said partition serves as a reflector for rays of light emitted by an incandescent lamp 34 mounted upon the bottom plate 4 adjacent to the lens 12.

The side walls 2 and 3 are provided with lenses 35 and 36 in alinement with the lamp 34, the lens 36 allowing a license card, tag or sign 37 to be illuminated at night. The card 37 can be detachably connected to a side flange or bracket 38 of the side wall 3.

The rear wall 6 of the casing has a socket member 39 by which the signal casing can be detachably connected to a bracket or suitable support forming part of a vehicle, said socket member being simply an example of one manner of supporting the signal.

In some instances, the operation of the signal can be manually controlled, but from the foregoing it will be observed that the elements indicating "Stop" can be easily operated by the clutch or throttle of a vehicle.

What I claim is:

1. In a signal for vehicles, a casing having the wall thereof provided with an opening, a shutter hinged to the inner side of the front wall of said casing at the upper edge of the opening thereof, a crank for opening said shutter, an electrically operated armature lever engaging said crank and adapted to open said shutter, an indicating arm pivotally mounted in said casing and adapted to swing through a side wall thereof, and a pin on said shutter extending into the inner end of said indicating arm whereby said shutter and arm can be actuated in synchronism.

2. In a signal for vehicles, a casing having the front wall thereof provided with arrow shaped openings and openings representing the characters of the word "Stop", shutters hinged in said casing to normally close the openings thereof, a crank at the hinge of each shutter, an electrically operated armature lever engaging each crank and adapted to open the shutter thereof, a member on the top of said casing adapted to be operated simultaneously with the actuation of the shutter of the "stop" opening of said casing, arrow shaped arms in said casing and adapted to swing through side walls thereof, and pins on some of said shutters extending into the ends of said arms whereby said shutters and arms can be actuated in synchronism.

In testimony whereof I affix my signature in presence of two witnesses.

HALLEY C. DOLAN.

Witnesses:
ANNA M. DORR,
C. R. STICKNEY.